(12) United States Patent
Cohen et al.

(10) Patent No.: US 12,696,997 B2
(45) Date of Patent: Aug. 4, 2026

(54) HOT AND COLD WATER DISPENSER AND METHOD

(71) Applicants: Shemon Cohen, Ashkelon (IL); S.B.I.D Solutions, Enterprise and Investments Ltd., Ashkelon (IL)

(72) Inventors: Shemon Cohen, Ashkelon (IL); Itamar Cohen, Ashkelon (IL)

(73) Assignees: Shemon Cohen, Ashkelon (IL); S.B.I.D. Solutions, Enterprise and Investments Ltd., Ashkelon (IL)

( * ) Notice: Subject to any disclaimer, the term of this patent is extended or adjusted under 35 U.S.C. 154(b) by 1121 days.

(21) Appl. No.: 17/620,136

(22) PCT Filed: Feb. 19, 2020

(86) PCT No.: PCT/IL2020/050184
§ 371 (c)(1),
(2) Date: Dec. 17, 2021

(87) PCT Pub. No.: WO2020/170248
PCT Pub. Date: Aug. 27, 2020

(65) Prior Publication Data
US 2022/0257048 A1 Aug. 18, 2022

(30) Foreign Application Priority Data

Feb. 19, 2019 (IL) .......................................... 264918

(51) Int. Cl.
*A47J 31/56* (2006.01)
*B67D 1/08* (2006.01)
*C02F 1/02* (2023.01)

(52) U.S. Cl.
CPC ............ *A47J 31/56* (2013.01); *B67D 1/0857* (2013.01); *B67D 1/0888* (2013.01);
(Continued)

(58) Field of Classification Search
CPC ................... A47J 31/56; B67D 1/0857; B67D 2210/00118
See application file for complete search history.

(56) References Cited

U.S. PATENT DOCUMENTS

| | | | | |
|---|---|---|---|---|
| 11,536,490 B2 * | 12/2022 | Zimmer | ............. | G05D 23/1919 |
| 11,612,263 B2 * | 3/2023 | Root | .................... | H05B 1/0263 219/412 |

(Continued)

FOREIGN PATENT DOCUMENTS

| | | |
|---|---|---|
| CA | 2101212 | 1/1994 |
| CN | 105188897 | 12/2015 |

(Continued)

OTHER PUBLICATIONS

International Preliminary Report on Patentability Dated Jun. 17, 2021 From the International Preliminary Examining Authority Re. Application No. PCT/IL2020/050184. (11 Pages).
(Continued)

*Primary Examiner* — Sean M Michalski

(57) ABSTRACT

A water dispenser for hot drinks comprises a water inlet, a hot water tank for storing water from the water inlet, a water heater for heating water in the tank, a hot water outlet for dispensing hot water, and a controller for operating the water heater to ensure that water dispensed is at a temperature suitable for a hot drink. The controller has a Sabbath and festival operational mode in which, at a predetermined time prior to a Sabbath onset time, the tank is filled and heated, and over a duration extending from the Sabbath or festival onset time until the corresponding end time, a water temperature in said tank is maintained by operating the water heater at predetermined intervals. A sensor detects a tank empty condition of the hot water tank, and the Sabbath
(Continued)

10 operation mode provides a function to stop operating the heater under the tank empty condition.

24 Claims, 7 Drawing Sheets

(52) U.S. Cl.
CPC .............. *B67D 1/0895* (2013.01); *C02F 1/02* (2013.01); *B67D 2210/00118* (2013.01); *C02F 2209/02* (2013.01); *C02F 2209/42* (2013.01); *C02F 2307/10* (2013.01)

(56) References Cited

U.S. PATENT DOCUMENTS

| | | | |
|---|---|---|---|
| 2006/0013573 A1* | 1/2006 | Phillips ................. | F24H 9/2021 |
| | | | 392/459 |
| 2014/0166447 A1* | 6/2014 | Thea ....................... | H01H 43/02 |
| | | | 200/19.01 |
| 2016/0170392 A1 | 6/2016 | Cohen | |
| 2016/0258652 A1* | 9/2016 | Nolte .................... | F24H 15/395 |
| 2022/0018576 A1* | 1/2022 | Zimmer ................... | F24H 4/04 |
| 2022/0142389 A1* | 5/2022 | Root ....................... | A47G 33/00 |

FOREIGN PATENT DOCUMENTS

| | | |
|---|---|---|
| GB | 1408387 | 10/1995 |
| IL | 47316 | 7/1978 |
| IL | 236214 | 10/2017 |
| IL | 256338 | 8/2018 |
| WO | WO 2007/133676 | 11/2007 |
| WO | WO 2020/170248 | 8/2020 |

OTHER PUBLICATIONS

International Search Report and the Written Opinion Dated May 18, 2020 From the International Searching Authority Re. Application No. PCT/IL2020/050184. (14 Pages).

Office Action Dated Sep. 4, 2022 From the Israel Patent Office Re. Application No. 264918. (4 Pages).

Office Action Dated Mar. 20, 2022 From the Israel Patent Office Re. Application No. 264918. (5 Pages).

The Zomet Institute "Hot Water for Drinking", The Zomet Institute, 3 P., Dec. 11, 2015.

* cited by examiner

Input location,

Offset between time zone time and local time

Determine sunset time for that day  for given lat. and long.

Sabbath onset = sunset − 18 or 40 minutes corrected for offset

Sabbath end = solar depression angle 7°5' + 3 minutes, or 8° 30'

200

210

220

230

240

HOT AND COLD WATER DISPENSER AND METHOD

RELATED APPLICATIONS

This application is a National Phase of PCT Patent Application No. PCT/IL2020/050184 having International filing date of Feb. 19, 2020, which claims the benefit of priority of Israel Patent Application No. 264918 filed on Feb. 19, 2019, The contents of the above applications are all incorporated by reference as if fully set forth herein in their entirety.

FIELD AND BACKGROUND OF THE INVENTION

The present invention, in some embodiments thereof, relates to a water dispenser and, more particularly, but not exclusively, to domestic or commercial scale hot and cold water dispensers, soda dispensers and combined water and soda dispensers.

Water heaters, hot water and drinks dispensers, soda dispensers and the like generally include internal controls that operate during the normal functioning of the dispenser. Alternatively or additionally the dispenser may be controlled intelligently either using an internal processor or by smart building or smart home controllers to operate as needed, according to timetables, according to user presence or motion and in other ways. Thus a dispenser that is part of a smart building system may keep water hot as long as people are present in the vicinity, at other times saving energy by not heating the water or by keeping the water at a lower, maintenance, temperature.

Such issues pose a problem for observant Jews, who regard electrical switching and direct intentional causation of switching on holy days such as the Sabbath and festivals as forbidden, and there being some debate as to what is considered as direct causation. The use of smart control itself is not a problem, as timetable-based operation is perfectly acceptable, however anything where switching is consequent on a conscious action of the user is undesirable.

The Sabbath observer therefore is happy to have smart control operating on the Sabbath, but seeks a way to avoid them impinging on his Sabbath observance.

In a standard hot drink dispenser, the drawing of water leads to emptying of the hot tank and its filling with cold water which then needs to be heated. Aside from the use of electricity, cooking on the Sabbath is forbidden, so that unless the hot water was heated prior to the onset of the Sabbath, use of the hot water is regarded as forbidden irrespective of how it was heated. On a festival day which is not also a Sabbath, heating of the water as such is allowed, and the only issue is the switching of electricity by the user, so that if dispensing of the hot water leads directly to heating in the tank it is problematic, but not otherwise. Heating of the water based on proximity sensing would be problematic both on the Sabbath and on a weekday festival.

SUMMARY OF THE INVENTION

The present embodiments relate to a hot (and if required cold) water dispenser that is able to provide hot water, and if required cold or chilled water and soda, during the week, and is able to continue providing the same on the Sabbath in a way that a Sabbath observer may use the hot water, and on a weekday festival in a way that one who observes the festival may use the hot water.

A hot (and cold) water dispenser comprises a water inlet, a hot water tank for heating water, a heater for the tank, an optional cold water outlet, a hot water outlet, and a controller for operating the water heater. The controller confers on the dispenser Sabbath and festival operational modes in which, at a predetermined time prior to a Sabbath onset time, the tank is filled and heated, and over a duration extending from the Sabbath or festival onset time until a Sabbath or festival end time, a water temperature in the tank is maintained by operating the water heater at preset intervals. A sensor detects a tank empty condition of the hot water tank and the Sabbath operation mode comprises a function to stop operating the heater on the empty tank. The festival mode allows refilling and heating of the tank. Entry into Sabbath or festival mode may entail disabling of electrical valves and/or pumps at the dispensing end and enabling of hand operated taps.

Thus, the present embodiments may have a Sabbath mode, a weekday festival mode and a weekday mode. In the Sabbath mode the tank is filled in sufficient time prior to the Sabbath to heat the water before the Sabbath. During the Sabbath itself, the temperature is maintained by applying heat at regular intervals without thermostatic control and no cold water is added to the hot water tank. In the weekday festival mode, by contrast, water is added to the tank. Again heating is automatic and is not consequential on the drawing off of water by the users. A mechanical float mechanism is used to measure the amount of water in the tank, and leads to filling of the tank in the festival mode. In the Sabbath mode the float mechanism stops any drawing of water beyond a preset level, so that the heater is protected from burning out.

The setting of the water dispenser into its respective modes may be automatic. Time switches that operate on a weekly basis are available. However the Sabbath starts and ends at different times each week as its hours are determined by local sunset times. Secondly, there are, in addition to the weekly Sabbath, eight or fifteen festival days on which the same issues apply, their dates being determined according to the Hebrew calendar.

The present embodiments may thus use microprocessor control to switch the mode of operation between the weekday mode, the Sabbath mode and the weekday festival mode, based on the Hebrew calendar and a knowledge of the local time and location.

A touch screen may be used to set the location, thus indirectly setting the times. Alternatively the times may be set directly, as desired.

In any smart device, a microprocessor with the time and date is generally present and thus the entire functionality of the three modes may be applied using software.

According to an aspect of some embodiments of the present invention there is provided a water dispenser for dispensing at least hot water for hot drinks, comprising:

a water inlet;

a hot water tank, connected to the water inlet via a first connection, for storing water from the water inlet;

a water heater associated with the hot water tank for applying heat to water in the tank;

a hot water outlet for dispensing hot water;

a controller for operating the water heater to ensure that water dispensed from the outlet is at a temperature suitable for a hot drink, the controller being configured with a Sabbath and festival operational mode in which, at a predetermined time prior to a Sabbath onset time, the tank is filled and heated, and over a duration extending from the Sabbath or festival onset time until a Sabbath or festival end time, a water temperature in the tank is maintained by operating the water heater at predetermined intervals; and a sensor for detecting a tank empty condition of the hot water tank, wherein the Sabbath operation mode comprises a function to stop operating the heater under the tank empty condition.

In an embodiment, the first connection is closed between the Sabbath onset time and the Sabbath end time to prevent addition of cold water to the tank over the duration.

In an embodiment, the first connection is open during a festival day which is a non-Sabbath day, to allow addition of cold water to the tank over the duration.

In an embodiment, the first connection is closed during the festival day which is not a Sabbath day while water in the tank is being heated by the heater.

In an embodiment, the hot and cold water outlets comprise mechanical taps.

Embodiments may comprise a cold water outlet, and the hot and cold water outlets comprise electrically actuated taps. The Sabbath operation thus comprises disabling the electrical actuation, thereby leaving a mechanical tap.

Embodiments may comprise a solenoid associated with the mechanical tap to disable operation of the mechanical tap.

In an embodiment, the solenoid is configured to disable the mechanical tap other than during the Sabbath operation.

In an embodiment, the solenoid is configured to disable the mechanical tap during the festival day which is not a Sabbath day while water in the tank is being heated by the heater and/or while the tank is being filled.

In an embodiment, the controller is part of a smart building control system.

Embodiments may have a user screen, the controller being configured to display information on the screen.

Embodiments may comprise a chilled water dispenser.

Embodiments may comprise a soda attachment for carbonating cold water prior to dispensing.

In an embodiment, the Sabbath operational mode comprises a function for carrying out carbonating of water at predetermined intervals.

Embodiments may include one or more tanks for flavored water.

Embodiments may comprise an attachment location for a beer barrel, the attachment being below the level of a dispensing tap, and a pump for pumping beer from the barrel for dispensing, and further comprising an intermediate tank above the level of the dispensing tap, the pump configured to operate when in the Sabbath mode to pump beer to the intermediate tank.

In embodiments, the hot water tank comprises a thermostat for controlling water temperature, the water temperature in the tank being maintained without reference to operation of any user operated control of the hot and cold water dispenser over the duration in the Sabbath mode being achieved by including a first function that causes signals from the thermostat to be ignored and a second function that switches on the heater at predetermined intervals.

In embodiments, the Festival operation mode comprises a function to fill the tank upon detection of the tank empty condition.

In embodiments, the sensor for detecting a tank empty condition comprises a float.

According to a second aspect of embodiments of the present invention there is provided a Sabbath and festival hot drink dispensing method comprising:

determining a Sabbath or festival onset time;

prior to the Sabbath onset time heating water in a tank such that at the Sabbath onset time the water reaches a temperature for dispensing hot drinks;

following the Sabbath or festival onset time applying heating to the tank at predetermined intervals;

dispensing the hot water upon user operation of a dispensing control;

detecting a tank empty condition; and in the case of a Sabbath day, ceasing to apply the heating; and in the case of a festival day that is not a Sabbath day, filling the tank.

According to a third aspect of the present invention there is provided a hot and cold water dispenser comprising:

a water inlet;

a hot water tank, connected to the water inlet via a first connection, for storing some of the water from the water inlet;

a water heater associated with the hot water tank for applying heat to water in the tank;

a cold water outlet for dispensing cold water;

a hot water outlet for dispensing hot water;

a controller for operating the water heater to ensure that water dispensed from the outlet is at a temperature suitable for a hot drink, the controller being configured with a Sabbath and festival operational mode in which, in a Sabbath mode, the water inlet is closed; and a mechanical sensor in the hot water tank for detecting a tank empty condition of the hot water tank, wherein the Sabbath operation mode comprises a function to stop operating the heater under the tank empty condition.

A sterilization function may be provided in which water is held at boiling temperature for a predetermined interval, thereby to provide sterile water, say for safely preparing baby food.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

DESCRIPTION OF SPECIFIC EMBODIMENTS OF THE INVENTION

Figure 1:
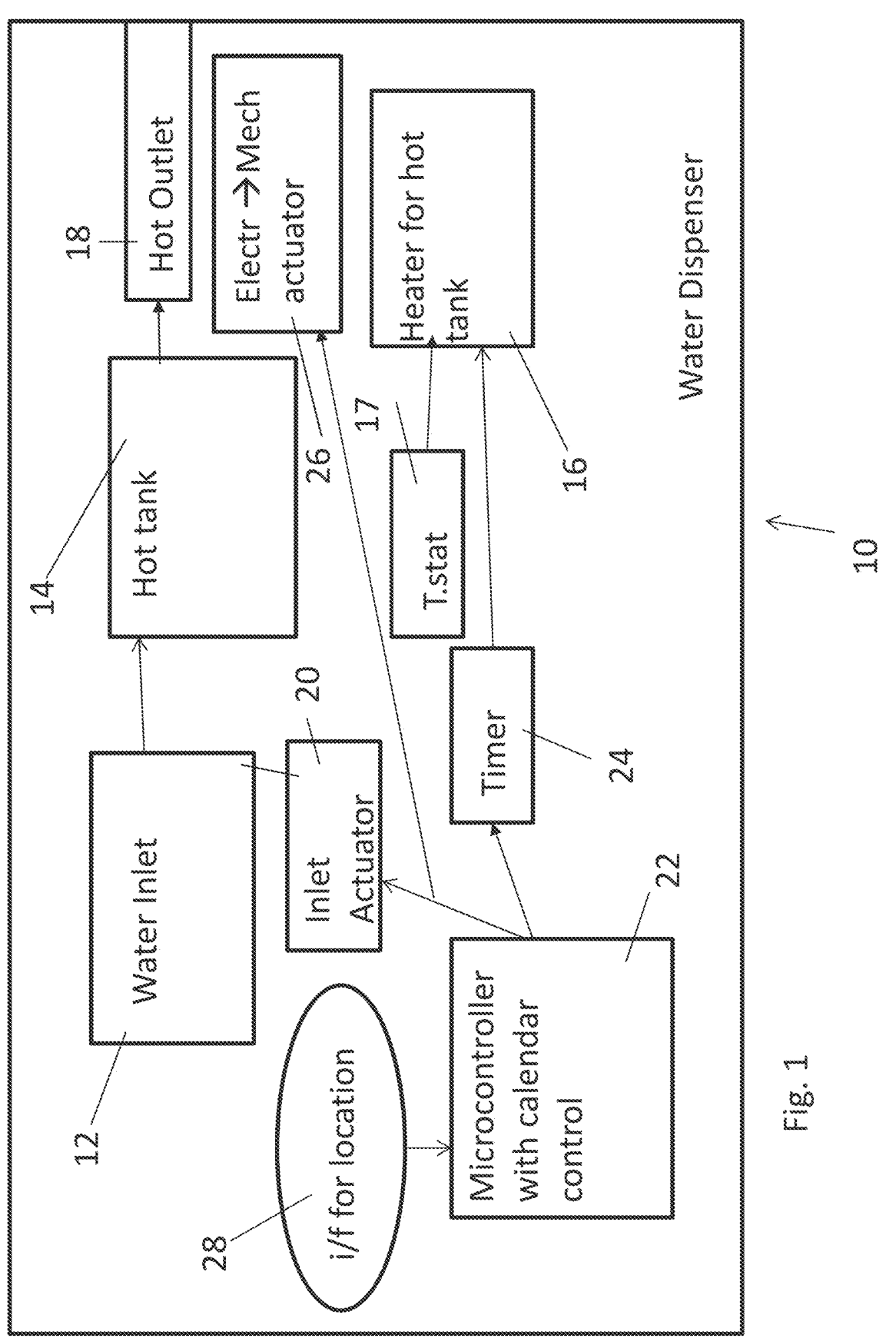
FIG. 1 is a simplified diagram showing a hot water dispenser with a Sabbath and a festival operational mode according to an embodiment of the present invention.

The present invention, in some embodiments thereof, relates to water dispensers and, more particularly, but not exclusively, to domestic or commercial scale hot, and optionally cold, water dispensers, including dispensers that may alternatively or additionally dispense soda, beer, and other drinks.

The present embodiments relate to water dispensers that heat water for dispensing and which have modes of operation for the Sabbath and festival days that allow for their use by the Sabbath observant. Thus in Sabbath mode operation, both the heating operation and the filling of cold water for subsequent heating are operations that are problematic. Thus the present embodiments provide a pre-Sabbath operation, carried out a predetermined time prior to Sabbath onset, of filling and heating the tank. Then in Sabbath operation, the water is maintained at a hot temperature but no cold water is drawn and dispensing of the hot water does not cause any measurement or heating operation to occur. In the Sabbath mode of operation, electrically operated buttons for dispensing water, if present, are inactivated and mechanical taps operate instead. A valve prevents filling with cold water, and the water temperature is maintained by operating at predetermined intervals. The thermostat is either disabled or its signals are ignored. In an embodiment, the thermostat signal to initiate heating is ignored but the thermostat signal to switch off heating when the desired temperature is reached is used. A mechanical float may be used to sense the water level in the tank and when a minimum level is reached so that no further water can be drawn, the heater is fully switched off to avoid burning out the element.

For operation on a weekday festival, filling with cold water for subsequent heating is allowed, as long as there is no direct connection between the dispensing operation and the heating operation. Thus a weekday festival mode may be defined in which dispensing hot water does itself not cause any heating to occur. However, once dispensing of water is over and a tank empty condition is detected, cold water is drawn to replace the water that has been used and refill the tank. In an embodiment, water is not drawn while heating has been completed. Drawing of cold water may take place automatically when the level in the tank falls to a predetermined threshold, and the level may be measured using the level of a float.

Thus a hot water dispenser according to the present embodiments may have separate modes of operation for pre-Sabbath onset, Sabbath, and weekday festivals.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1 which shows a water dispenser. The water dispenser may provide hot water for tea and coffee and the like. In addition the dispenser may provide cold water, and in some cases there may be other options, say an option for medium temperature water, or a tap for soda or other carbonated drinks. The dispenser 10 may have a water inlet 12 and a hot water tank 14. The hot water tank 14 may be connected to the water inlet via a pipe or other connection, and may hold some of the water from the water inlet. A water heater 16 is provided to heat the water in the hot tank and typically is operated with thermostat 17 so that the water in the tank is kept at a specified temperature. Thus the water heater 16 operates whenever the tank is filled with fresh cold water until the target temperature is reached, and then turns on again when the water falls to a threshold temperature and remains on until the target temperature is reached again. Hence the water heater is indirectly operated as a consequence of a user drawing water.

Figure 2:
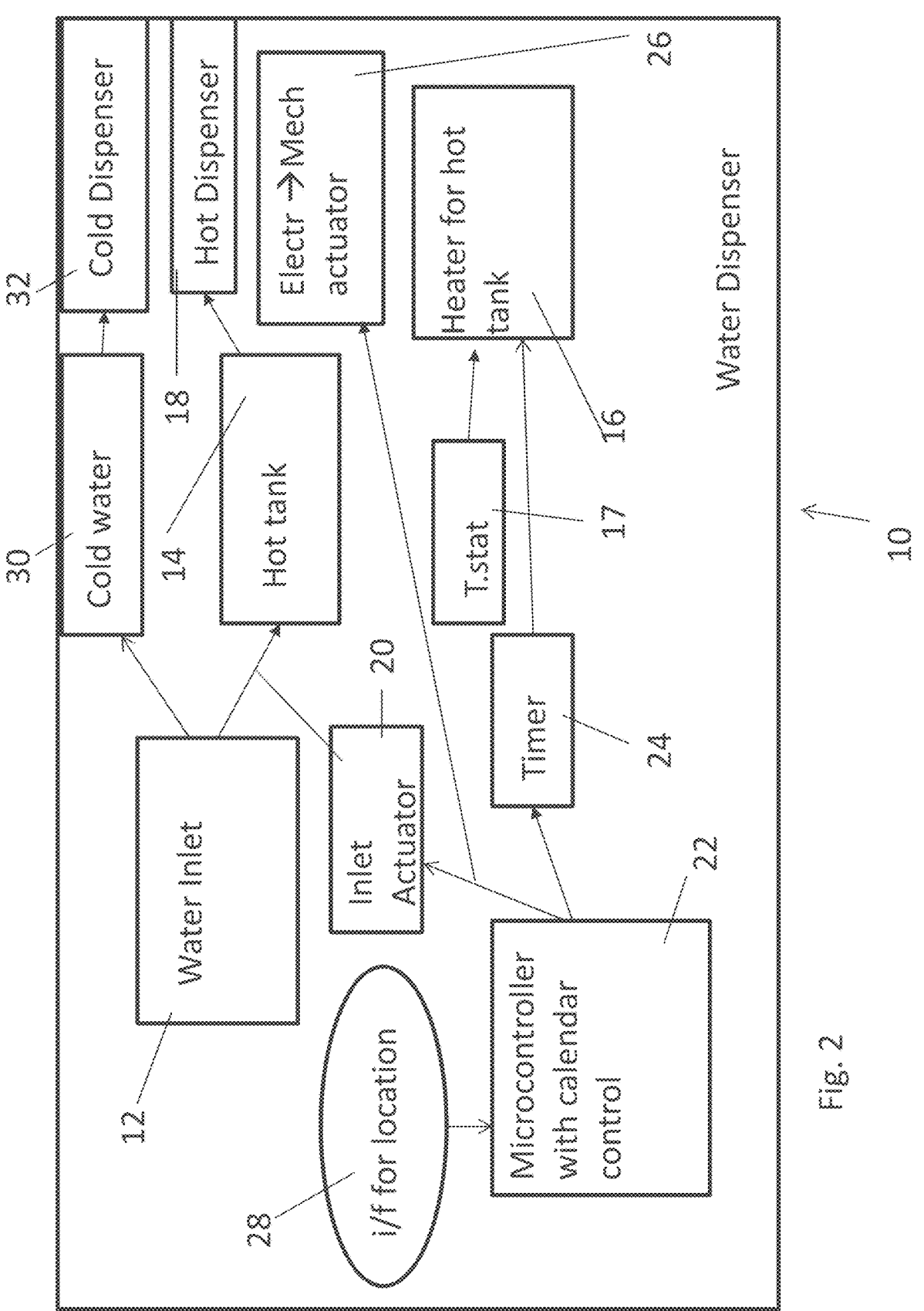
FIG. 2 is a simplified diagram showing a hot and cold water dispenser similar to that of FIG. 1, according to an embodiment of the present invention.

Outlets are provided such as hot water outlet 18, which may be a button or a tap which the user operates to obtain hot water. Other outlets such as a cold water outlet 32 leading from cold water tank 30 may be present—see FIG. 2. In the case of a button, a valve or pump is operated electronically in order to provide water. In the case of a tap, a valve is operated mechanically by a user.

A controller 22 operates the dispenser 10 and may for example set the control points for thermostat 17 to ensure that water dispensed from the outlet is at a temperature suitable for a hot drink. Likewise the controller may ensure that valves are operated to keep the tank full. The controller may have a Sabbath and/or festival operational mode in which, at a predetermined time prior to a Sabbath onset time, the tank is filled and heated, so that the water is ready and hot prior to the Sabbath. During the Sabbath or festival and until a specified Sabbath or festival end time, the water temperature in the tank is maintained. However the heat is maintained by operating the water heater at preset intervals, say using timer 24 rather than thermostat 17. Thus heating is not caused by the user drawing water from the tank 14.

In an embodiment, a sensor detects when the tank is empty. When such a tank empty condition is detected, the Sabbath operation mode comprises a function to stop operating the heater, so that overheating is avoided. However the water inlet is kept closed throughout the duration of the Sabbath to prevent addition of cold water to the tank. In the festival mode the tank is refilled, as heating of water for consumption is permitted. The only issue is that the heating should not be directly caused by the user's actions.

In the case of festival operation, an embodiment ensures that the water inlet 12, or the water outlet 18 both are kept closed while water in the tank is actually being heated by the heater. This allows the thermostat 17 to be used to govern the heating of the water without the user being able to affect the operation of the thermostat. Embodiments may include inlet actuator 20 to govern flow of cold water from the mains to fill the hot tank 14.

In one embodiment the hot and cold etc. water outlets make use of mechanical taps. In other embodiments, electrical buttons are used to actuate valves. The use of electrical actuation on the Sabbath and Festivals is problematic, so in such embodiments the electrical actuation is supplemented with a mechanical tap. In one embodiment the tap and the electrical valve are connected in series. In this case, an electrical to mechanical actuator 26 may be operated at the Sabbath or festival onset time to open the electrical valve and close the mechanical tap, thereby allowing the mechanical tap to override the electrical valve over the Sabbath or festival. In another embodiment the mechanical tap and electrical valve are in parallel sections of pipe, so the electrical to mechanical actuator closes the electrical valve, again leaving the mechanical tap as the default operation. In both cases, the electrical valve is disabled, in the sense that it is rendered irrelevant to operation during the Sabbath or Festival, leaving only a mechanical tap.

A solenoid may be positioned around the mechanical tap to disable operation of the mechanical tap during the standard operating mode, namely during week.

The same solenoid may be operated to disable the mechanical tap during a festival day which is not a Sabbath day while water is being heated or while the tank is being filled.

A function may be provided, in the weekday operation, to provide a sterilization function in which the hot water is fully boiled and, as desired, kept at boiling point for a preset time. Such a function may be useful for preparing food for babies, or for sterilizing vessels for any reason.

The sterilization function may be used with a sterile tank in which the sterilized water may be stored, for example to cool to a temperature suitable for preparation of baby food. In one embodiment, the sterile tank may include a cooling element.

A further function, in the weekday operation mode, may allow the user to define a desired temperature, and the controller determines a suitable mix of hot and ambient or cold water to achieve the desired temperature.

The microcontroller may in embodiments be associated with a location interface 28 which determines the dispenser's location. In one embodiment the interface may obtain the location information from user input. Alternatively the location interface may obtain the location information from an Internet service such as the user's Google™ account. As a further alternative the location interface may obtain the location information using GPS or cellular information. Location information may then be used in conjunction with the clock in the microcontroller 22 to calculate local Sabbath and festival start and end times.

In embodiments, the controller is part of a smart building control system, so that a connection such as wifi or Bluetooth™ connection is used to link the microcontroller 22 with other parts of a network within the building. In this way the dispenser may be either a master or slave component of the smart building control.

The dispenser may have a user screen, and microcontroller 22 may display information on the screen and allow the user to program the dispenser. In the case where the dispenser is a master component of a smart building control system the user may be able to use the screen to program smart control for the entire building or for part of the building.

Returning to FIG. 2 and cold water tank 30 may include chilling functionality so that the dispenser may provide chilled water.

In embodiments a soda attachment may provide a pressurized tank to which carbon dioxide containers may be attached. Thus the dispenser may carbonate cold water prior to dispensing.

In general the act of carbonating water is not regarded as desecrating the Sabbath, however some take a stricter view. Thus, in an embodiment the Sabbath operational mode includes a function for carrying out carbonating of water at preset intervals, rather than relying on user action.

A tank may be provided to dispense flavored water or specified drinks. These may be chilled or not as desired.

Embodiments may provide an attachment location for a beer barrel. In general, beer containers are relatively large and so the attachment may be below the level of the relevant dispensing tap. In such a case, a pump is provided that may pump beer from the barrel for dispensing, however use of such a pump may be a desecration of the Sabbath. Thus for the purposes of the Sabbath mode of operation, a typically smaller intermediate tank is placed above the level of the dispensing tap. As the dispenser enters Sabbath or festival mode, the pump operates to pump beer to fill the intermediate tank, and then during the Sabbath or the festival, beer can be dispensed without using the pump.

One may summarize the Sabbath mode operation vis a vis heating water by saying that during the Sabbath mode operation, either the thermostat is switched off or signals from the thermostat are ignored. Instead the heater is switched on at preset intervals. In the festival mode the same applies, except that the thermostat may be used as fresh water is being heated. However drawing of water while the thermostat is in operation is prevented. As mentioned, the Festival operation mode includes a function to fill the tank upon detection of a tank empty condition, and reference is now made to FIG. 3 which shows a sensor 40 in hot water tank 42. As shown, the sensor 40 is a mechanical float.

Figure 4:
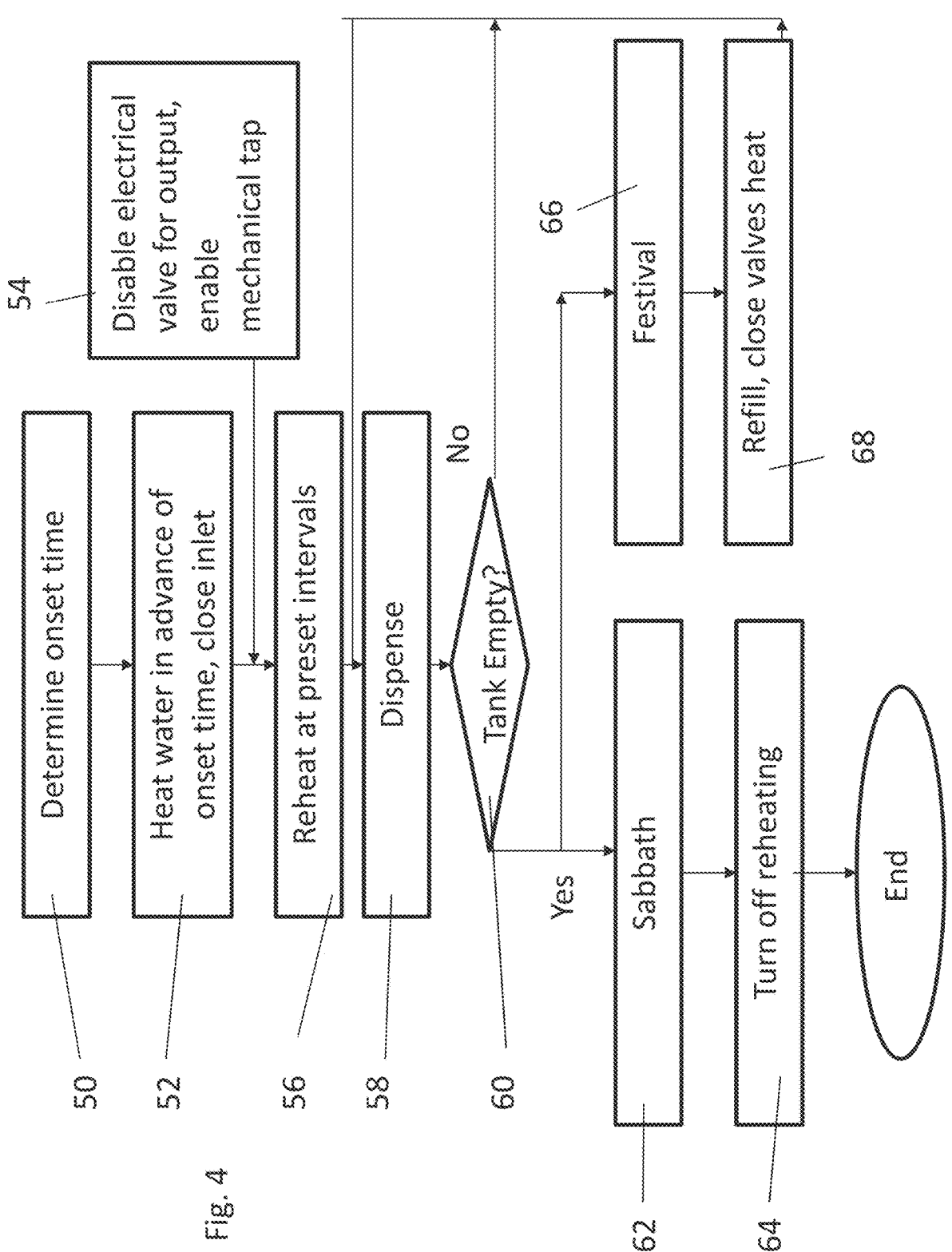
FIG. 4 is a simplified flow chart showing the Sabbath and festival operating modes of the dispenser of FIGS. 1 to 3, according to an embodiment of the present invention.

Reference is now made to FIG. 4, which is a simplified flow chart illustrating operation of the Sabbath and festival mode for a hot drink dispenser according to embodiments of the present invention. The method comprises initially determining 50 the date and time of onset of a Sabbath or festival, and this may use methods outlined in FIGS. 5 and 6 hereinbelow.

Then once such an onset time is determined, the dispenser enters into a procedure—box 52—that ensures that the tank is full with hot water and that the inlet to the tank is closed, so that the dispenser is ready with a full tank of hot water. The procedure may involve filling the tank as necessary and heating.

At the onset time, or typically a preset clearance time beforehand, any electronic pumps or valves, particularly at the dispensing end, are switched off and mechanical taps are enabled instead —54.

Following the Sabbath or festival onset time, or the preset clearance time beforehand if used, the thermostat is disabled and heating of the tank is carried out by operating the heater at preset intervals —56. Hot water may now be dispensed by users operating a tap —58, the dispensing having no effect on the operation of the heater.

In box 60 a tank empty condition is looked for. If no tank empty condition is detected then flow returns to allow continued dispensing of hot water. If however the tank empty condition is detected then further flow depends on whether it is a Sabbath day or a weekday festival.

In the case of a Sabbath day—branch 62, heating ceases 64 and no further hot water is dispensed.

In the case of a festival day that is not a Sabbath day—66, the inlet valve is opened while the tap is disabled. Then the inlet valve is closed and the water is heated. In one embodiment the thermostat is used. Once the heating is complete, the thermostat is switched off and the tap is enabled, allowing continued drawing of hot water 58.

In one embodiment, the screen may be used to display Sabbath compatibility information so that Sabbath Observant hotel guests for example may be made aware that they can use the facilities.

Figure 3:
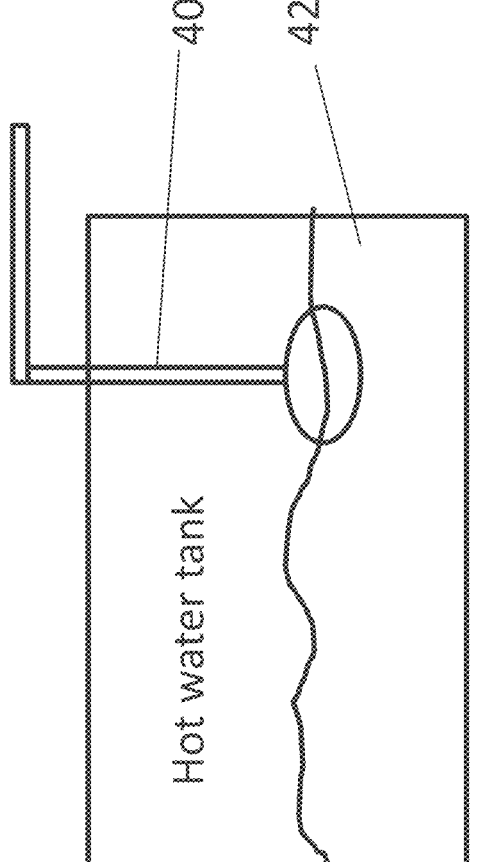
FIG. 3 is a simplified diagram showing a float for a tank empty sensor, according to embodiments of the present invention.

As mentioned, the tank empty condition may be determined from the height of a float in the tank as per FIG. 3.

For general use, the drinks dispenser may include a camera and the camera may allow remote control of the drinks dispenser say from a mobile telephone. A user may be able to turn off the hot water say when small children are around, even if not personally present. Alternatively, the user may be able to remotely instruct small children to place a cup in position and then remotely provide hot water into the cup, say to melt chocolate, prior to filling the cup with cold water, and then instructing the children to approach when the cup is at a safe temperature.

The drinks dispenser may have a touchscreen to program the different modes. The dispenser may for example be provided with different colored LED lights or strips of different colored LED lights and programs of changing colored displays may be provided. Automatic displays of different color lights or different sequences of colors may be added to the festival and Sabbath modes. The lighting sequences may include use of randomized color sequences or the lighting may be set to a fixed color.

The drinks dispenser may also provide cold and/or refrigerated water. In embodiments an option may be provided to add soda. In another embodiment the drinks dispenser may provide an option for flavoured water or even beer and like beverages.

As discussed above, the tanks for the drinks may be placed at the level of the dispensing tap so that no pumping is required. However beer is often provided in barrels, and even small barrels may be difficult to accommodate above the level of the tap. A barrel that is below the level of the tap requires pumping and directly operating an electric pump is not allowed on the Sabbath or festivals.

Thus, in order to provide beer on the Sabbath or festivals when pumping is required, an intermediate tank may be provided that is above the level of the tap. Operation of the tap draws beer from the upper tank and does not operate a pump. Separately from the operation of the tap, the upper tank being emptied below a preset level may operate the pump. The pump is not actually operated by the user pressing the tap and thus Sabbath and festival use is permitted.

The following discusses the calculation of the times and the dates.

The Hebrew calendar is neither a solar calendar like the Gregorian calendar, nor a lunar calendar like the Moslem calendar, but is a hybrid lunar-solar calendar, which makes its calculation far from trivial.

The following is a discussion about how to calculate the Hebrew calendar.

The Jewish calendar combines three unconnected astronomical phenomena: the rotation of the Earth about its axis, the day; the revolution of the moon about the Earth, the month; and the revolution of the Earth about the sun, the year. These three phenomena are independent of each other, and there is no correlation between them. The moon revolves around the Earth in about 29½ days. The Earth revolves around the sun in about 3651/4 days, that is, about 12 lunar months and 11 days.

To coordinate between the above three phenomena, the Jewish calendar consists of 12 or 13 months of 29 or 30 days, and can be 353, 354, 355, 383, 384 or 385 days long. The centerpiece of the calendar is the new moon, referred to in Hebrew as the Molad.

A new month on the Jewish calendar begins with the Molad. The Molad for the month of Tishri is the most important one for calendar calculations, and is referred to as Molad Tishri.

Note that the calculated Molad does not correspond precisely to the astronomical new moon. The length of time from one astronomical new moon to the next varies somewhat because of the eccentric orbits of the Earth and Moon; however, the calendar Molad is set using a fixed average length of time: 29 days, 12 hours, and 793 parts, commonly written in an abbreviated form: 29d 12h 793p, where the part, or chelek, is a unit of time equal to 3⅓ seconds. There are 18 parts in a minute and 1,080 parts in an hour.

The time for the Molad is Jerusalem local time, which is not the same as the time on the clock, even in Jerusalem, since clocks use the time zone time, not the local time.

Figure 5:
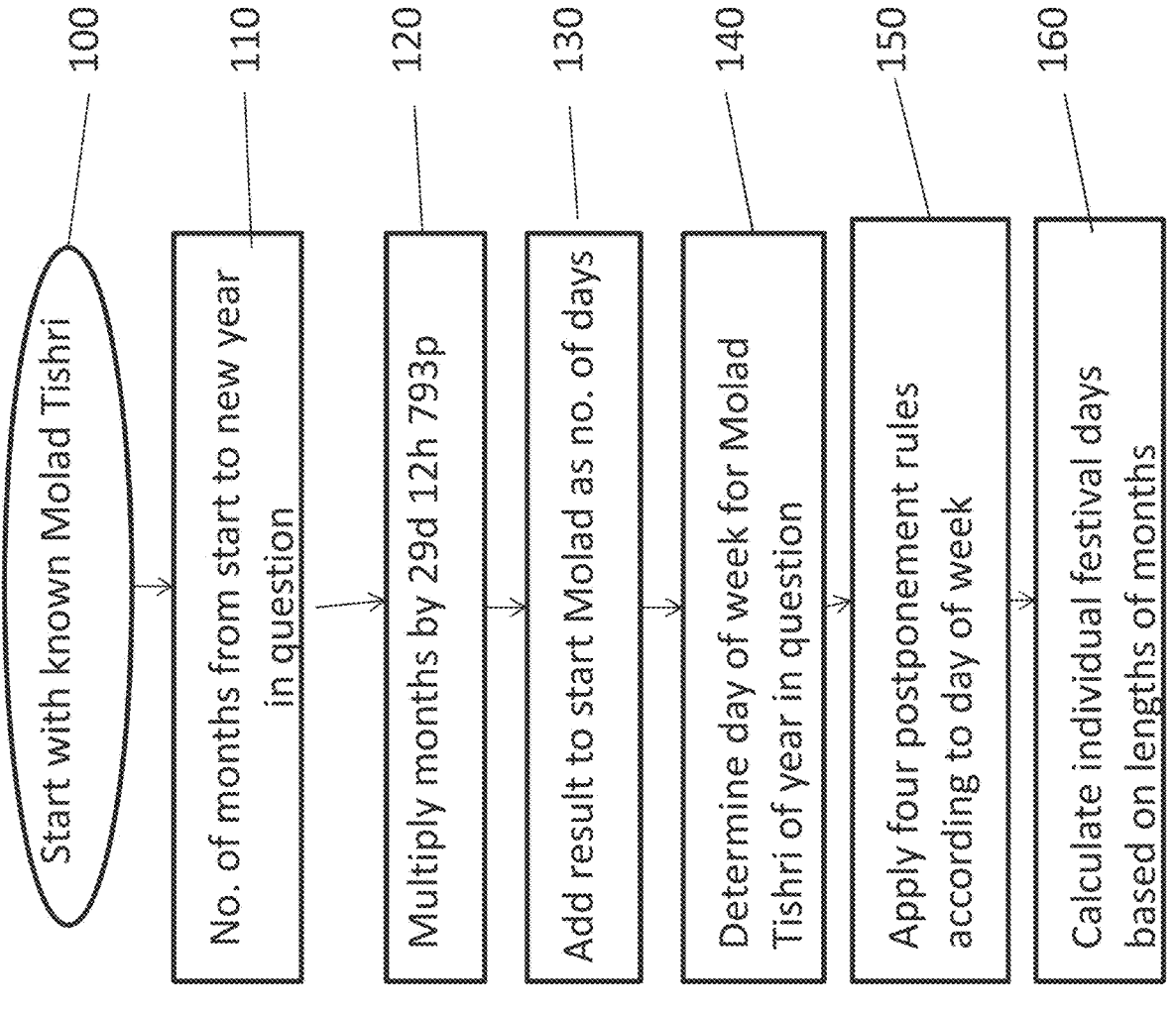
FIG. 5 is a flow chart showing steps in calculating dates of festivals using the Hebrew calendar.

Reference is now made to FIG. 5, which shows the stages involved in calculating the date of the New Year—Rosh Hashanah on the Jewish calendar:

The calculation begins with box 100, taking a known Molad Tishri, the day of the week and the corresponding date in the Gregorian calendar.

In box 110 the calculation determines the number of months between the known Molad and Molad Tishri of the year of interest.

In box 120 the number of months is multiplied by the length of the Molad interval: 29d 12h 793p to give a number of days and fractions of a day.

The result is then added to the known starting Molad as a number of days—box 130.

In box 140 the number of days modulo seven added to the start day of the week gives the day of the week of the Molad Tishri.

In box 150 the four postponement rules are used to determine the actual date to be used for the New Year—Rosh Hashanah for the current year.

In box 160, the secular date is obtained by adding the number of days elapsed, calculated in box 120, to the secular starting date and correcting for intervening leap years.

Box 110 in greater detail requires to determine how many months are between the starting point used and Tishri of the year of your end point. There are exactly 235 months in every 19-year cycle of leap years (12 12-month years plus 7 13-month years), but if the number of years is not evenly divisible by 19, then it is necessary to determine whether each remaining year is a regular year (12 months) or a leap year (13 months).

The leap year cycle is calculated as follows. Leap years occur in years 3, 6, 8, 11, 14, 17 and 19 of a 19-year cycle, and the 19-year cycle begins in the year 1, so you can simply divide the year number by 19 and examine the remainder. If the remainder is 3, 6, 8, 11, 14, 17 or 0 (the 19th year of the cycle) then the year is a leap year. Otherwise, it is not.

In box 120, we multiply the number of months by the average length of the Molad, which is 29d 12h 793p:
Box 130 requires adding the elapsed time calculated above to the starting date to get the ending date.

At this point, we note the number of days elapsed between our starting point and our ending point as a number of days. We note this at this point in the calculation, after the hours are rounded into the days but before the weekday of the starting Molad is added to the number of days. This number of days will be necessary to determine the Gregorian date in box 160.

Box 150 involves applying what are known as postponements or dechiyot, which are needed to find the correct days on which the festivals occur. There are four rules of postponement which postpone the date of Rosh Hashanah, but do not affect the calculated time of the Molad. One of the postponements is a general rule of rounding to ensure the year has a whole number of days, while the rest are designed to prevent oddities in the length of the year and the date of Rosh Hashanah.

Postponement 1: Molad Zakein—General Rounding Rule.

The first postponement is Molad Zakein, meaning an "old" Molad. If the Molad occurs at or after noon, the Molad is considered to be "old" and we round to the next day. This rule is quite commonly applied, affecting a quarter of all years.

The rule of Molad Zakein simply means that a Molad at or after noon relates to the day that starts at the next sunset, 4-10 hours later, rather than the previous sunset which was 14-20 hours earlier.

Note that when postponements like this apply, a day must be added to the elapsed time for purposes of calculating the Gregorian equivalent date, but the Molad does not change. The unchanged Molad is used for purposes of calculating subsequent years and for certain religious purposes.

Postponement 2: Lo A"DU Rosh

The second postponement is known as Lo A"DU or Lo A"DU Rosh. This rule states that Rosh Hashanah cannot occur on a Sunday, a Wednesday or a Friday. If the calculated Molad occurs on one of these days of the week, Rosh Hashanah is postponed by a day to prevent other problems with the calendar.

This postponement is also commonly applied, as you might imagine. It applies to three out of seven days, so one would expect it to occur almost half of the time.

Note that the postponements of Molad Zakein and Lo A"DU Rosh can work in combination. Thus the rule of Molad Zakein must be checked before the rule of Lo A"DU Rosh.

Postponement 3: Gatarad

The remaining two postponements are much less commonly applied.

Postponement Gatarad holds that if Molad Tishri in a simple 12-month, non-leap, year occurs on a Tuesday at 9h 204p or later, Rosh Hashanah is postponed to the next day, a Wednesday, which by the effect of Lo A"DU Rosh would then be postponed to Thursday.

Why does such a complicated rule exist? This rule prevents the possibility that a year might be 356 days, an invalid length. Consider: a Molad Tishri at 3d 9h 204p would not be postponed by Molad Zakein or Lo A"DU Rosh. Add 12 lunar cycles (354d 8h 8'76p) to the next year's Rosh Hashanah and you get 7d 18h 0p with 354 days elapsed. Molad Zakein applies to the following year, postponing Rosh Hashanah to the next day, a Sunday, with 355 days elapsed. Lo A"DU Rosh is then triggered, postponing Rosh Hashanah and leaving 356 days elapsed and making the current year an invalid length. Gatarad takes days away from the following year and adds them to the preceding year, so both years are a valid length.

Note that Gatarad invariably triggers Lo A"DU Rosh. Gatarad only applies when Rosh Hashanah is Tuesday and Gatarad postpones Rosh Hashanah to Wednesday. Lo A"DU Rosh then postpones Rosh Hashanah to Thursday.

Note also that this rule is not combined with Molad Zakein. If Molad Zakein applies to the current year, Gatarad is unnecessary; thus Gatarad applies only to Molads between 9h 204p and 17h 1079p.

Postponement 4: Betutkafot

Like Postponement Gatarad, this rule is not very commonly applied and is also designed to prevent a year from having an invalid length. Postponement Betutkafot prevents a leap-year from having 382 days, too few days, by postponing Rosh Hashanah of the non-leap year following the leap year.

If Molad Tishri in a year following a leap year occurs on Monday after the 15th hour and 589 parts, then it is postponed to the next day. The rule is applied only if the actual Molad occurs on Monday, not if it is postponed to Monday. Like Gatarad, the rule really only applies to Molads before noon, because Molad Zakein handles the postponements for Molads at or after noon. Unlike Gatarad, Betutkafot does not trigger Lo A"DU Rosh, because Betutkafot postpones Rosh Hashanah from a Monday to a Tuesday and Tuesday is an acceptable day for Rosh Hashanah.

Microprocessors are typically programmed with the Gregorian date, so a final stage is to determine the Gregorian date, at least for a starting point. Typically, one would calculate the Gregorian date for Rosh Hashanah and work from there. One may take the elapsed days calculated in Step 4, add any additional days triggered by the postponements in Step 5, and add this number of days to the date of Rosh Hashanah for the known Molad.

The principles above are sufficient to convert Rosh Hashanah to a Gregorian date for any year. However, for the remaining festivals, one may calculate either that year's Rosh Hashanah, the following year's Rosh Hashanah or both and use this information to work out the date based on the lengths of months. Additional information relates to the month of the festival being considered. The following contains information for all of the months, irrespective of whether festivals are involved.

Tishri

Tishri is the month of Rosh Hashanah, so you simply add the date of the month to Rosh Hashanah and subtract 1 (because Rosh Hashanah is Day 1).

Cheshvan

Cheshvan is the second month of the calendar year, and the preceding month of Tishri is always 30 days, so you simply take the current Rosh Hashanah, add 29 days (30—1 for Rosh Hashanah) and add the date of the month.

Kislev

Kislev is the hardest month to calculate. You cannot simply work forward from the current year's Rosh Hashanah, because the preceding month of Cheshvan can be 29 or 30 days, nor can you work backward from the next year's Rosh Hashanah, because Kislev itself can also be 29 or 30 days. To calculate the length of Kislev, you need to know the date of Rosh Hashanah of both the current year and the next year, then calculate the difference between them to determine the length of the current year. If the year is 353, 354, 383 or 384 days, then Cheshvan is 29 days and you can determine a date in Kislev taking the current Rosh Hashanah, adding 58 days, then adding the date of the month. If the year is 355 or 385 days, then Cheshvan is 30 days and you can determine a date in Kislev by taking the current Rosh Hashanah, adding 59 days, then adding the date of the month.

Tevet, Shevat

The remaining months of the year are of unchanging length, but the number of months varies depending on whether the year is a leap year! Tevet and Shevat are best calculated by working backwards from the following year's Rosh Hashanah and subtracting an additional 30 days in a leap year. Tevet's offset in a non-leap year is −266; Shevat's is −237.

Adar, Adar I and Adar II

Adar is always offset −207 from the following Rosh Hashanah; however, in regular years, Adar is the 12th month of the year (starting from Nissan), and in leap years, is known as Adar II and is the 13th month of the year. Adar I, the extra month inserted as the 12th month in leap years, is always offset −237 days from Rosh Hashanah.

Nissan, Iyar, Sivan, Tammuz, Av, Elul

The remaining months of the year are all of unchanging length and not affected by leap years. Simply subtract the appropriate number of days from the following year's Rosh Hashanah and add the date of the month.

Figure 6:
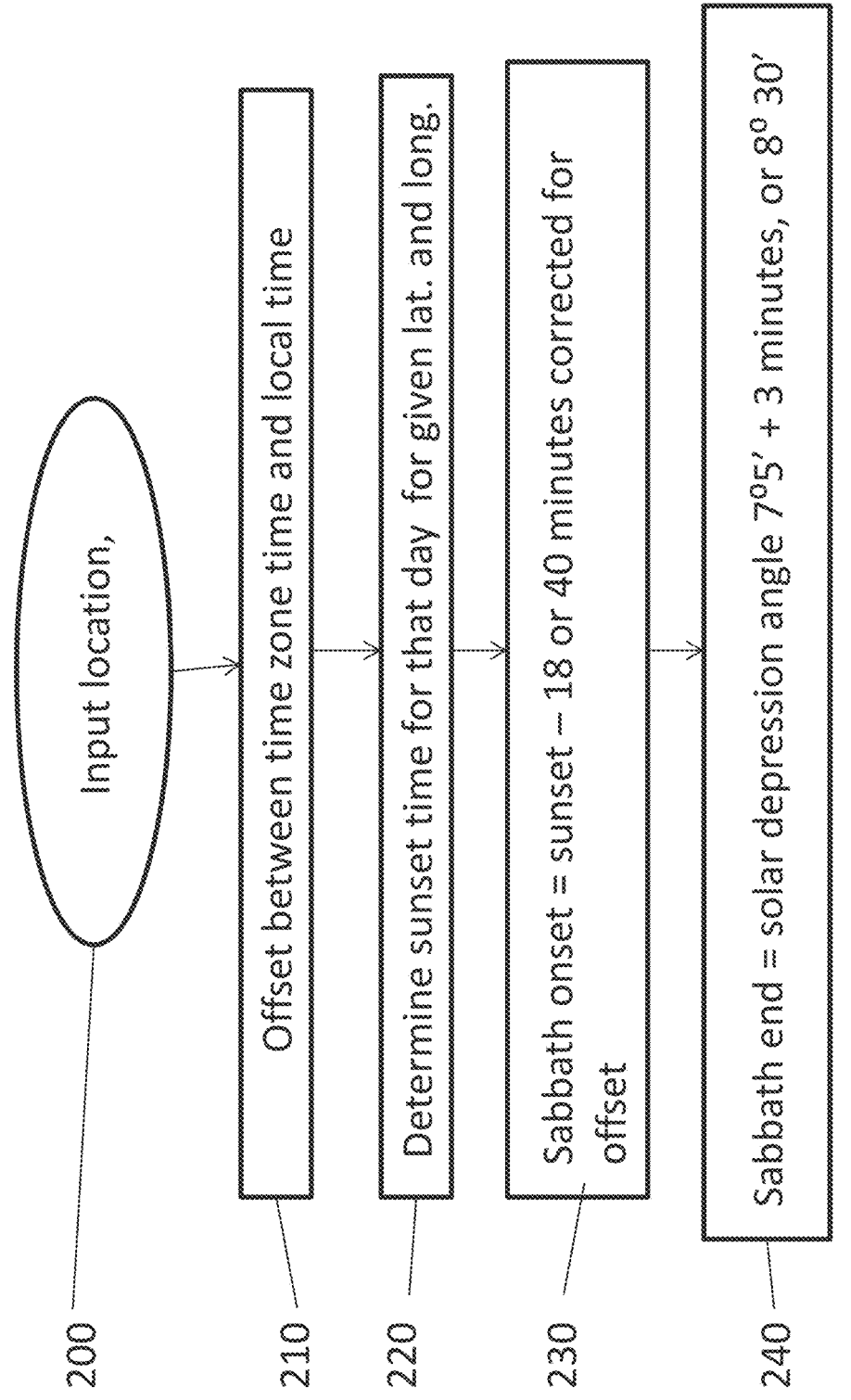
FIG. 6 is a simplified diagram showing how to obtain Sabbath onset and ending times.

Reference is now made to FIG. 6, which illustrates calculation of Shabbat onset times requires longitude and latitude at the location in question. Local time at any given location is an offset of the time zone time being observed which can be obtained using the longitude and latitude, provided in box 200. Published sunset times are not likely to be for either the given location or based on the local time and so cannot be used. Instead an offset is calculated between clock time and actual local time, box 210, and actual sunset times for the given location are calculated in terms of local time—box 220—and then may be converted into the clock time using the offset. The Sabbath onset time is for most locations 18 minutes prior to the local sunset time. In Jerusalem, the Sabbath onset time is 40 minutes prior to the local sunset time—box 230.

The Sabbath ending time is based on a definition of nightfall that depends on the depression angle of the sun below the horizon. Some authorities use a solar depression angle of seven degrees and five minutes, and then add three minutes to the resulting time. Other authorities use a solar depression angle of eight and a half degrees with no time added—box 240.

In practice tables are available of the calendar and of Sabbath times, and numerous programs are available for calculating either. The microprocessor however needs to know the local coordinates and the time according to the local time zone in order to obtain the correct answers.

Figure 7:
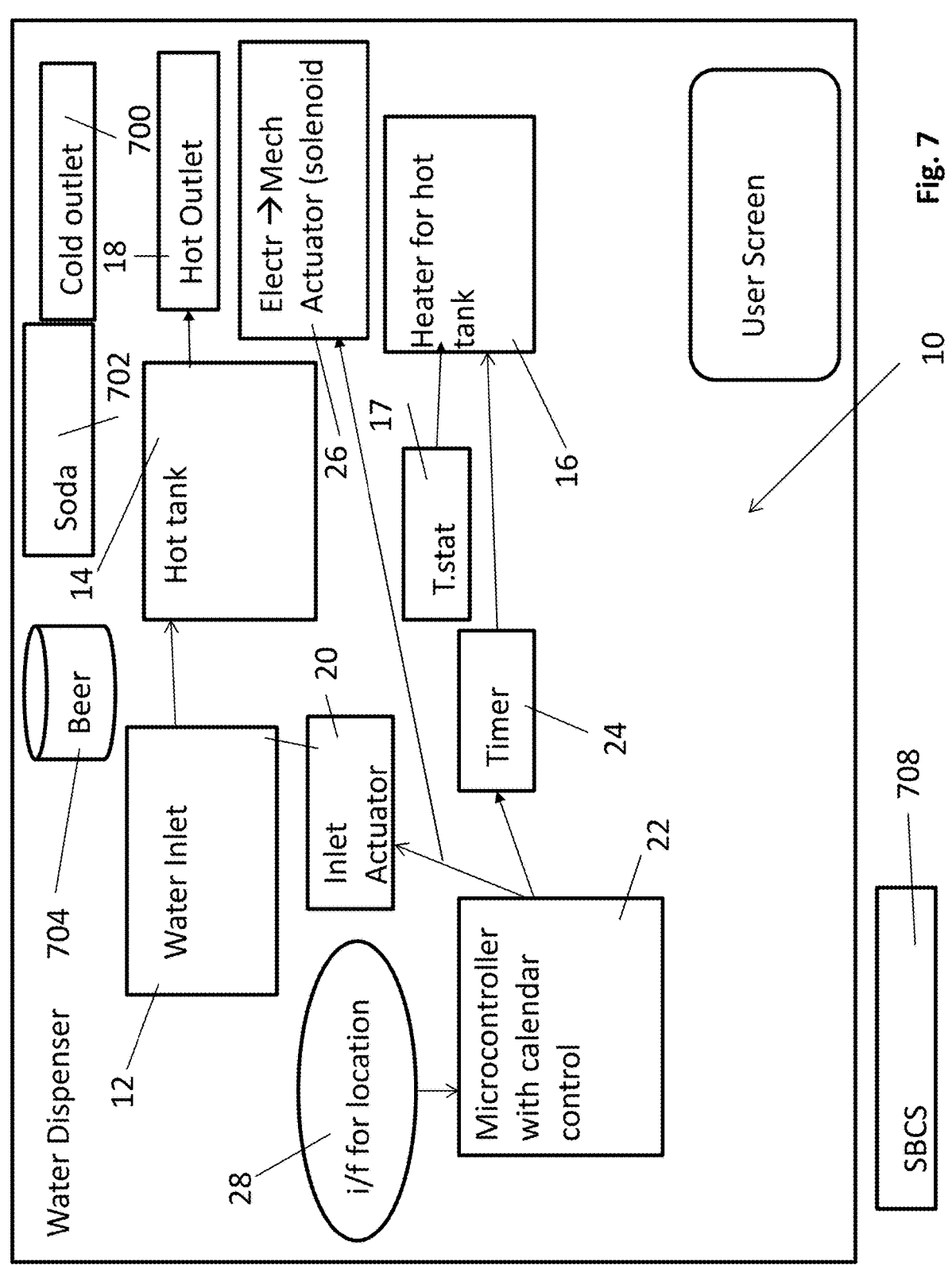
FIG. 7 is a view of the device of FIG. 1 shown in greater detail.

Reference is now made to FIG. 7 which shows the device of FIG. 1 in greater detail. Parts that are the same as in FIG. 1 are given the same reference numerals and are not described again except as needed for an understanding of the present embodiments.

A cold outlet 700 allows for dispensing of cold water. Optionally a soda attachment 702 may be provided. The soda attachment may have a function for carrying out carbonating of water at predetermined intervals. A beer etc container 704 may also be provided.

Electrical-mechanical actuator 26 may comprise a solenoid.

A user screen 706 may be provided.

A smart building control system (SBSC) 708 may control the water dispenser.

It is expected that during the life of a patent maturing from this application many relevant actuators and control techniques for refrigeration will be developed and the scope of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A water dispenser for dispensing at least hot water for hot drinks, comprising:

a water inlet;

a hot water tank, connected to said water inlet via a first connection, for storing water from the water inlet;

a water heater associated with said hot water tank for applying heat to water in said tank;

a hot water outlet for dispensing hot water;

a controller for operating said water heater to ensure that water dispensed from said outlet is at a temperature suitable for a hot drink, the controller being configured with first, second and third operational modes, said first mode being a weekday mode wherein water is heated and replaced when dispensed, said second mode being a Sabbath operational mode, and said third mode being a weekday festival operational mode, wherein, in said second mode and said third mode, at a predetermined time prior to a Sabbath onset time, said tank is filled and heated, and over a duration extending from said Sabbath or festival onset time until a Sabbath or festival end time, and a water temperature in said tank is maintained by operating said water heater at predetermined intervals, wherein said first connection is controllable to be closed between said Sabbath onset time and said Sabbath end time to prevent addition of cold water to said tank over said duration, said first connection being controllable in said third mode to be open, to allow addition of cold water to said tank over said duration;

a mechanical tap for said hot water outlet, and a sensor for detecting a tank empty condition of said hot water tank, wherein said second, Sabbath, operation mode comprises a function to stop operating said heater under said tank empty condition, in said third operational mode, said first connection being automatically controllable to open, during a festival day which is a non-Sabbath day, to allow addition of cold water to said tank over said duration, said first connection subsequently being closed in said third mode, during said festival day which is not a Sabbath day while said cold water added to said tank is fully heated by said heater;

a cold water outlet, wherein said hot and cold water outlets respectively have electrically actuated taps, and wherein said second and third operational mode comprise disabling said electrical actuation, thereby leaving hot and cold water mechanical taps.

2. The hot water dispenser of claim 1, wherein said first connection is closed during said third mode, during said festival day which is not a Sabbath day, while water in said tank is being heated by said heater.

3. The hot water dispenser of claim 1, further comprising a cold water outlet, said cold water outlet having a mechanical tap.

4. The hot water dispenser of claim 1, further comprising a cold water outlet, wherein said hot and cold water outlets respectively have electrically actuated taps, and wherein said second and third operational modes comprise disabling said electrical actuation, thereby leaving hot and cold water mechanical taps.

5. The hot water dispenser of claim 4, further comprising a solenoid associated with said cold water mechanical tap to disable operation of said mechanical tap.

6. The hot water dispenser of claim 5, wherein said solenoid is configured to disable said cold water mechanical tap other than during said Sabbath operation.

7. The hot water dispenser of claim 5, wherein said controller is part of a smart building control system.

8. The hot water dispenser of claim 5, having a user screen, the controller being configured to display information on said screen.

9. The hot water dispenser of claim 5, further comprising a chilled water dispenser.

10. The hot water dispenser of claim 9, further comprising a soda attachment for carbonating cold water prior to dispensing.

11. The hot water dispenser of claim 10, wherein said second, Sabbath operational, mode comprises a function for carrying out carbonating of water at predetermined intervals.

12. The hot water dispenser of claim 5, further comprising at least one tank for flavored water.

13. The hot water dispenser of claim 5, further comprising an attachment location for a beer barrel, the attachment being below the level of a dispensing tap, and a pump for pumping beer from the barrel for dispensing, and further comprising an intermediate tank above said level of said dispensing tap, said pump configured to operate when in said second and third operational modes to pump beer to said intermediate tank.

14. The hot water dispenser of claim 5, wherein said hot water tank comprises a thermostat for controlling water temperature, said water temperature in said tank being maintained without reference to operation of said thermostat over said duration in said second and third modes, by including in said second and third modes a first function that causes signals from said thermostat to be ignored and a second function that switches on said heater at predetermined intervals.

15. The hot water dispenser of claim 5, wherein said third, Festival, operation mode comprises a function to fill said tank upon detection of said tank empty condition.

16. The hot water dispenser of claim 1, wherein said sensor for detecting a tank empty condition comprises a float.

17. A Sabbath and festival hot drink dispensing method comprising:

determining a Sabbath or festival onset time and a corresponding end time, thereby to carry out dispensing in first, second and third modes, said first mode applying at all times except between said Sabbath and festival onset times and their respective end times, said second mode applying between a Sabbath onset time and said corresponding end time, and a festival mode applying between a festival onset time which is not also a Sabbath and said corresponding end time;

prior to said Sabbath or festival onset time filling a tank and heating water in said tank such that at said Sabbath or festival onset time the tank is full with water at temperature for dispensing hot drinks;

in said second and third modes, following said Sabbath or festival onset time, disabling electrical operation of hot and cold water outlets to leave mechanical operation of said hot and cold water outlets, and applying heating to said tank at predetermined intervals;

dispensing said hot water upon user operation of a dispensing control;

detecting a tank empty condition; and in the case of said second mode, on a Sabbath day, ceasing to apply said heating; and in the case of said third mode, on a festival day that is not a Sabbath day, automatically filling said tank with cold water and fully heating said cold water in said tank while disabling said mechanical operation of said hot water outlet during said full heating of said cold water, wherein said tank empty condition is detected from the height of a float in the tank.

18. The hot drink dispensing method of claim 17, further comprising, in said second mode, preventing intake of cold water into said tank between said Sabbath onset time and said Sabbath end time.

19. The hot drink dispensing method of claim 17, wherein said method is carried out as a part of a smart building control system.

20. The hot drink dispensing method of claim 17, comprising displaying Sabbath compatibility information in association with said dispensing.

21. The hot drink dispensing method of claim 17, further comprising carbonating and dispensing cold water, the method comprising carrying out carbonating of water at predetermined intervals in said second and third modes between said respective onset time and said corresponding end time.

22. The hot drink dispensing method of claim 21, comprising detecting said tank empty condition from the height of a float in said tank.

23. A hot and cold water dispenser comprising:
a water inlet;
a hot water tank, connected to said water inlet via a first connection, for storing some of the water from the water inlet;
a water heater associated with said hot water tank for applying heat to water in said tank;

an electrically operated cold water outlet for dispensing cold water;
an electrically operated hot water outlet for dispensing hot water;
a controller for operating said water heater to ensure that water dispensed from said outlet is at a temperature suitable for a hot drink, the controller being configured with first, second and third operational mode, said first, weekday, mode, in which water in said hot water tank is heated and dispensed, and said hot water tank is refilled as needed, said second, Sabbath mode, in which said water inlet is closed, and electrical operation of said hot and cold water outlets is disabled to leave mechanical operation thereof, and said third, weekday festival mode, in which said electrical operation of said hot and cold water outlets is also disabled; and
a mechanical sensor in said hot water tank for detecting a tank empty condition of said hot water tank, wherein said second, Sabbath, operation mode comprises a function to stop operating said heater under said tank empty condition, and said third, festival, operational mode comprises a function to fill and heat said tank and disable said mechanical operation of said hot water outlet during said heating, wherein said mechanical sensor comprises a float in the tank and said tank empty condition is detected from the height of said float in said tank.

24. The hot and cold water dispenser of claim 23, wherein said mechanical sensor comprises a float.

* * * * *